(12) United States Patent
Lee

(10) Patent No.: US 8,006,865 B2
(45) Date of Patent: Aug. 30, 2011

(54) DISC FEEDING APPARATUS

(76) Inventor: Shu-Yuan Lee, Panchiao (TW)

( * ) Notice: Subject to any disclaimer, the term of this patent is extended or adjusted under 35 U.S.C. 154(b) by 403 days.

(21) Appl. No.: 12/135,201

(22) Filed: Jun. 8, 2008

(65) Prior Publication Data
US 2009/0179043 A1 Jul. 16, 2009

(30) Foreign Application Priority Data
Jan. 11, 2008 (TW) ................................ 97200764 U

(51) Int. Cl.
*B65H 3/00* (2006.01)
*B65H 3/28* (2006.01)
*B65G 59/00* (2006.01)
*G07F 11/16* (2006.01)

(52) U.S. Cl. ........ 221/258; 221/223; 221/152; 221/298; 221/238; 221/283; 221/232; 221/270; 369/30.34; 414/796.9; 414/798.1; 414/801

(58) Field of Classification Search .................. 221/258, 221/36, 152, 221, 298, 238, 223, 283, 232, 221/270; 369/30.34; 414/796.9, 798.1, 801
See application file for complete search history.

(56) References Cited

U.S. PATENT DOCUMENTS

| | | | | |
|---|---|---|---|---|
| 1,028,458 A * | 6/1912 | Hassmann | ................... | 221/152 |
| 1,058,144 A * | 4/1913 | Blank | ........................ | 221/298 |
| 1,311,170 A * | 7/1919 | Lockwood | .................. | 221/223 |
| 1,666,008 A * | 4/1928 | Graffenberger | ............... | 221/221 |
| 1,761,009 A * | 6/1930 | De Vries | ........................ | 221/223 |
| 2,730,268 A * | 1/1956 | Moesch | ........................ | 221/221 |
| 2,834,511 A * | 5/1958 | Booth | ........................ | 221/116 |
| 3,768,694 A * | 10/1973 | Miller | ........................ | 221/221 |
| 4,741,458 A * | 5/1988 | Odorici | ........................ | 221/221 |
| 4,742,937 A * | 5/1988 | Blom | ........................ | 221/223 |
| 4,830,375 A * | 5/1989 | Fleming | ................... | 273/148 R |
| 5,238,143 A * | 8/1993 | Crighton | ........................ | 221/7 |
| 5,482,428 A * | 1/1996 | Kuhlman | .................. | 414/798.1 |
| 5,702,029 A * | 12/1997 | Yang | ........................ | 221/221 |
| 6,113,345 A * | 9/2000 | Ashby | ........................ | 414/801 |
| 6,782,544 B2 * | 8/2004 | Russ | ........................ | 720/619 |
| 6,786,359 B1 * | 9/2004 | Schroeder | .................... | 221/222 |
| 7,337,919 B2 * | 3/2008 | Walsh et al. | .................. | 221/221 |
| RE40,598 E * | 12/2008 | Russ | ........................ | 720/619 |
| 2004/0084472 A1 * | 5/2004 | Thompson | .................... | 221/232 |
| 2005/0194397 A1 * | 9/2005 | Hecht | ........................ | 221/223 |
| 2007/0008835 A1 * | 1/2007 | Russ | ........................ | 369/30.34 |
| 2007/0228067 A1 * | 10/2007 | Hecht | ........................ | 221/232 |
| 2009/0025020 A1 * | 1/2009 | Kahle | ........................ | 720/615 |
| 2009/0134182 A1 * | 5/2009 | Walsh et al. | .................. | 221/221 |
| 2009/0178043 A1 * | 7/2009 | Prasanna et al. | ............. | 718/102 |

\* cited by examiner

*Primary Examiner* — Gene O. Crawford
*Assistant Examiner* — Rakesh Kumar

(57) ABSTRACT

A disc feeding apparatus comprises a supporting base, a pusher and an electric driving device. The pusher is driven by the electric driving device to back and forth, such that one edge of the disc is protruded out of the first protruding portion of the supporting base, and the other edge of the disc is limited by the avoiding groove of the second protruding portion and will be pushed by the pusher. Thereby, the disc will fall out of the disc feeding apparatus, thus finishing the feeding of the disc. The present invention can use the precise control electric driving device to cooperate with other structures. With the simplified structure design, the present invention can perform the disk feeding operation efficiently and precisely for a long tome.

9 Claims, 6 Drawing Sheets

DISC FEEDING APPARATUS

BACKGROUND OF THE INVENTION

1. Field of the Invention

The present invention relates to a disc feeding apparatus for separately recording a feeding mechanism or a guiding mechanism between carrier switching devices, and more particularly to a disc feeding apparatus which can feed the discs in a first in first out manner and can connect to a switch or other disc controlling devices to feed the discs semi-automatically or automatically.

2. Description of the Prior Art

Disc has found a wide application, for example, video/audio disc and data disc, the types of the disc include DVD, VCD, CD and blu-ray disc, and the disc is the most important record carrier of the day for storing data.

The existing disc feeding method for mass production generally uses a complex large-scale automatic mechanism which involves a mechanical arm mainly consisted of a hydraulic connecting rod assembly, a vacuum suction disc and other components, wherein the suction disc is employed to hold the disc, and then the mechanical arm is used to transport it to a predetermined position. However, this conventional disc feeding method still has the following disadvantages that need to be improved:

Firstly, since the connecting structure between the hydraulic connecting rod assembly and the vacuum suction disc is complicated, and it also requires many control circuits and driving circuits, therefore, the cost is relatively high.

Secondly, the conventional feeding process is complicated and includes many steps, such as sucking, transporting, releasing and repositing, therefore, the conventional feeding method is time consuming and has a long working travel and a low feeding efficiency, imperceptibly increasing the production cost.

Thirdly, the conventional disc feeding apparatus is complicated and expensive, and the mechanism and the circuits occupy a large space, therefore, it is usually used in factory and is unsuitable for commercial and personal use.

For example, a company or an individual often uses discs as a medium for storage of data, and usually a cylinder-shaped disc container (which is professionally called pudding bag) is required to hold a large number of discs. The user has to open the container, take out the disc, close the container and finally place the disc in a disc receiving plate of an equipment, so it is really inconvenient and time consuming.

In addition, when the discs are nearly used up and the container needs to be refilled with new discs, based on the principle of first in first out, the user has to take out the original discs, putting the new discs in, and finally put the original discs back into the disc container. This is an obvious inconvenience to the user.

To solve the above-mentioned problems, the author of this present invention has invented a disc feeding apparatus which comprises less components, can fed the disc quickly and is convenient to operate.

The present invention has arisen to mitigate and/or obviate the afore-described disadvantages.

SUMMARY OF THE INVENTION

The primary objective of the present invention is to provide a disc feeding apparatus which has a simplified structure and can reduce the cost.

To achieve the objective of the present invention, the disc feeding apparatus comprises a supporting base, a pusher and an electric driving device. The electric driving device drives the pusher to back and forth, such that the discs can be fed successfully.

The present invention can use the precise control electric driving device to cooperate with the simplified structure to facilitate the feeding of the discs.

The second objective of the present invention is to provide a disc feeding apparatus which can cooperate with other electric control disc apparatuses (such as disc rewriter) to perform the disk feeding operation efficiently and precisely for a long tome.

To achieve the objective of the present invention, the electric driving device drives the pusher to back and forth, such that one edge of the disc is protruded out of the first protruding portion of the supporting base, and the other edge of the disc is limited by the avoiding groove of the second protruding portion and is pushed to be fallen off by the pusher, such that the disc will fall onto a position where the disc is to fall off, thus finishing the feeding of the disc.

The present invention can use the precise control electric driving device to cooperate with other electric control disc apparatuses (such as disc rewriter). With the simplified structure design, the present invention can perform the disk feeding operation efficiently and precisely for a long tome.

The third objective of the present invention is to provide a disc feeding apparatus which can be applied to the disc container or guiding post and can reduce the feeding time and feed the discs precisely, and when in use, the disc container is directly mounted on the disc feeding apparatus.

To achieve the objective of the present invention, around the edge of a feeding hole of the supporting base is formed an annular flange for mounting the disc container, or is disposed with a plurality of sockets for installing the guiding posts.

Thereby, the disc feeding apparatus of the present invention can be applied to the disc container or guiding post, and when the user puts the new discs in the disc container, an additional operation is not needed.

It is to be noted that the second protruding portion is pivotally disposed with a piece having a smooth surface, and the position at which the piece is pivoted corresponds to a feeding opening of the feeding hole. Thereby, the disc can be fed successfully, so as to prevent the disc from being scraped due to the friction of the disc and the second protruding portion.

On an inner surface of the feeding hole is formed a protruding slant feeding surface that is connected between a position where the disc is to fall off and the feeding opening, and the falling disc can be guided out of the feeding opening by the cooperation of gravity and the protruding slant feeding surface.

The pusher of the present invention is an integrally formed annular plastic member, and the ordinary combined type of assembly assembled by linking or engaging method is considered still within the scope of the present invention.

The driving structure of the electric driving device and the pusher of the present invention is designed to be an eccentric member and an elliptical groove.

One side of the pusher is defined with the elliptical groove, and in the elliptical groove is defined with an admissible space located in the non-operating direction. The electric driving device can be an electric motor and drives a power shaft to rotate. On a top of the power shaft is installed an eccentric member that is received in the elliptical groove of the pusher. When the electric driving device drives the power shaft to rotate, the eccentric member rotates in the elliptical groove and drives the pusher to back and forth. Since in the elliptical groove is defined with an admissible space located in the non-operating direction, the eccentric member will influence a predetermined moving direction of the pusher.

In addition, in an operation space of the supporting base is installed a sensor for sensing the operation of the pusher, so as to electricly control the electric driving device.

Further, the present invention can use the precise control electric driving device to cooperate with the eccentric member and the elliptical groove, so the cost can be reduced, and the electric driving device can cooperate with other electric control disc apparatuses to perform the disk feeding operation efficiently and precisely for a long tome. Thereby, the present invention can be applied to various kinds of disc apparatuses.

Moreover, the pusher of the present invention is driven by the electric driving device to back and forth, such that one edge of the disc is protruded out of the first protruding portion of the supporting base and finally fallen into the feeding hole at a lower part of the first protruding portion of the supporting base. At the same time, the other edge of the disc is limited by the avoiding groove of the second protruding portion and will be pushed by the pusher to be protruded out of the second protruding portion and the avoiding groove. Thereby, the disc will fall onto the protruding slant feeding surface, since one edge of the disc is fallen off, thus finishing the feeding of the disc.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Referring to FIGS. 1-4, a disc feeding apparatus in accordance with the present invention comprises a supporting base 10, a pusher 20 and an electric driving device 30.

Figure 1:
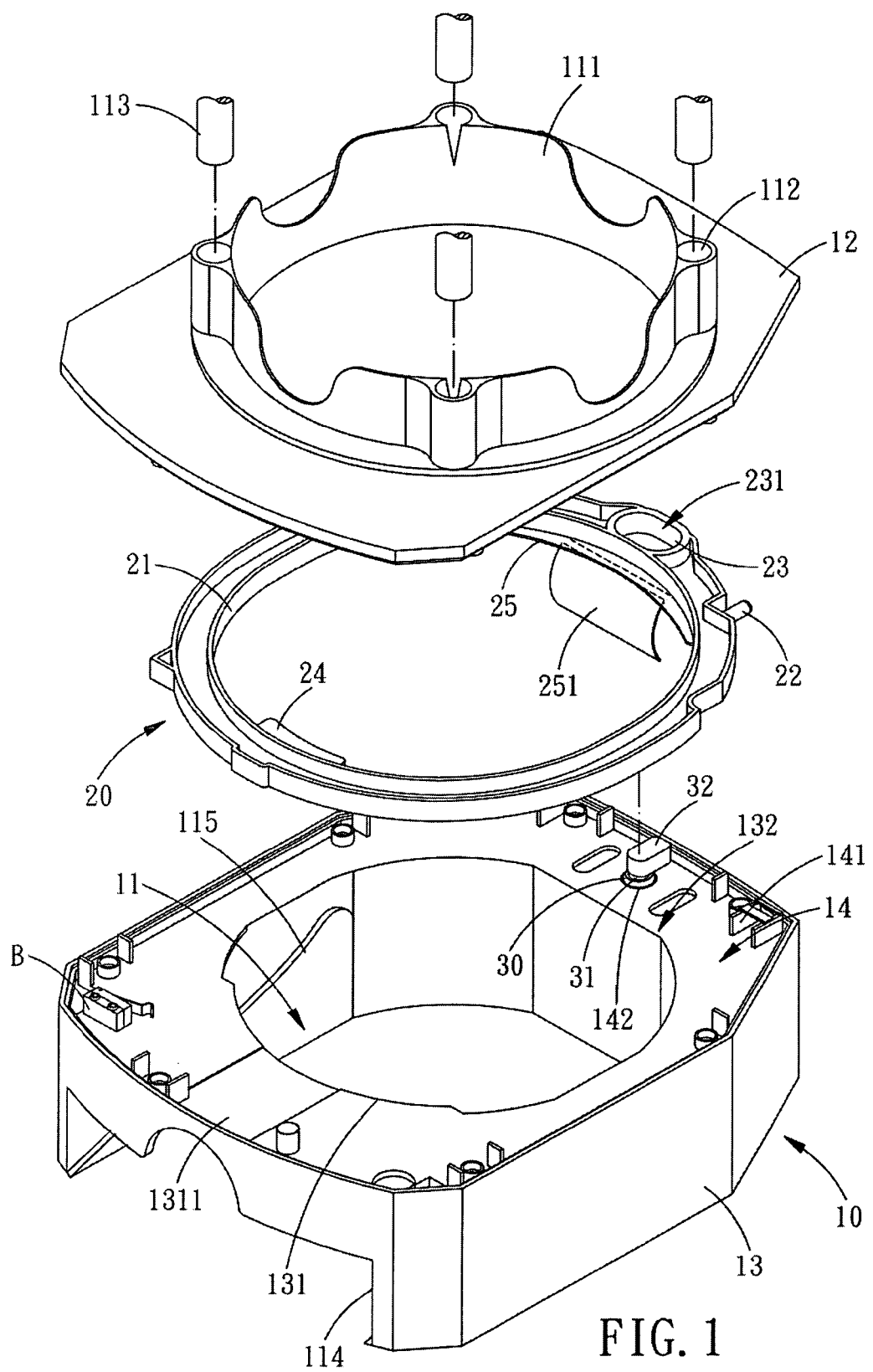
FIG. 1 is an exploded view of a disc feeding apparatus in accordance with the present invention.
Figure 2:
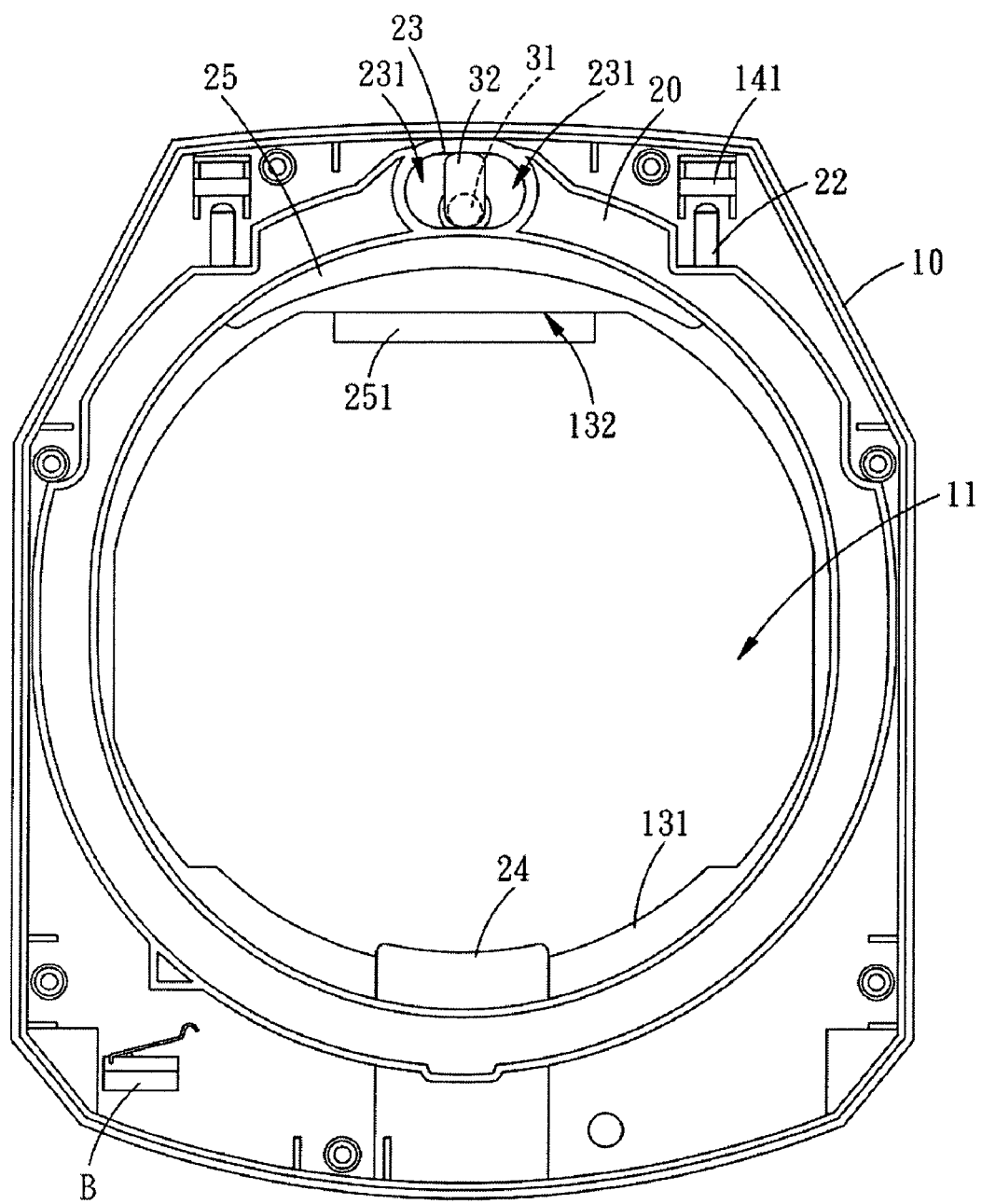
FIG. 2 is an assembly cross sectional view of the disc feeding apparatus in accordance with the present invention.
Figure 3:
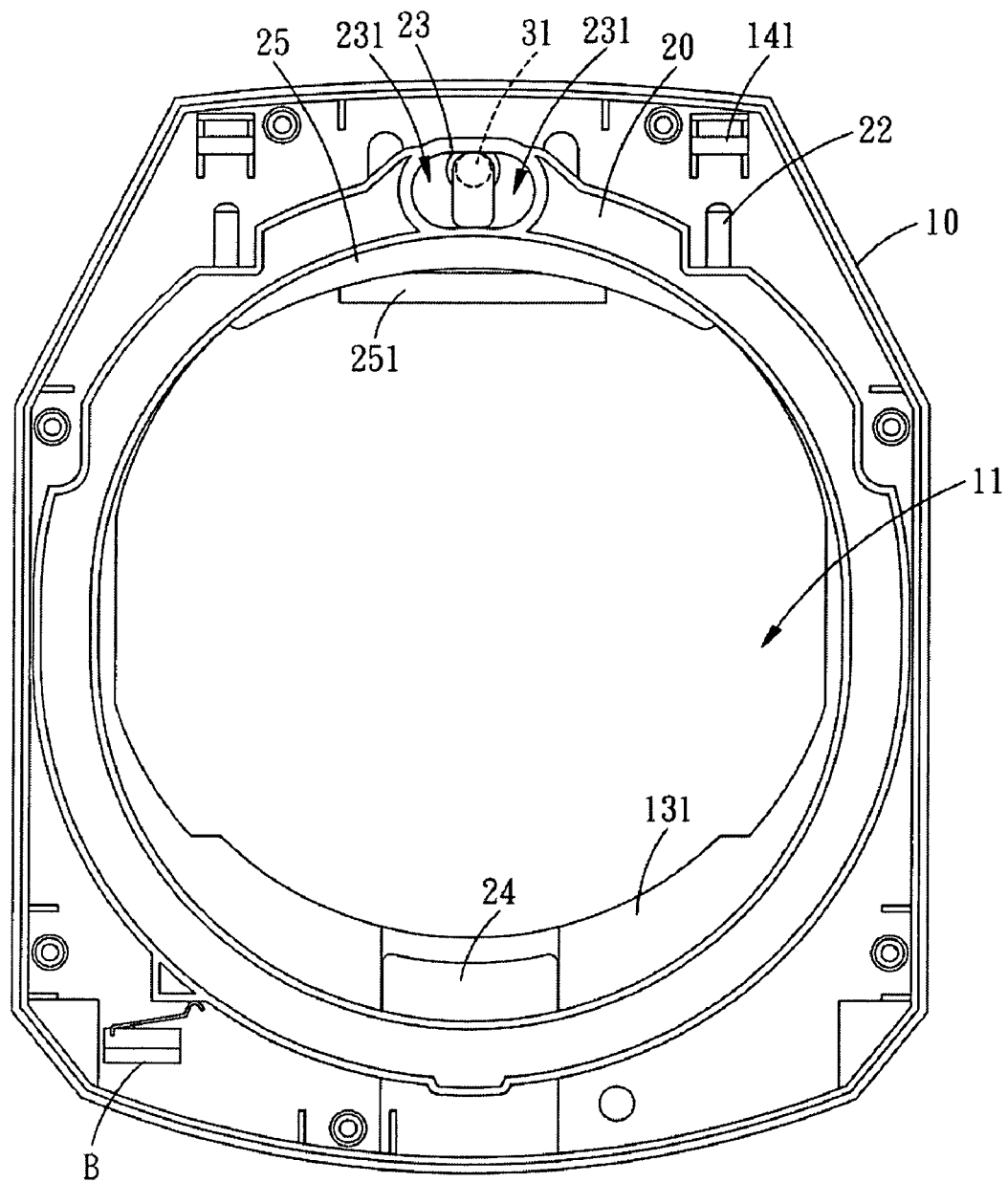
FIG. 3 is an assembly cross sectional view of the disc feeding apparatus in accordance with the present invention.
Figure 4:
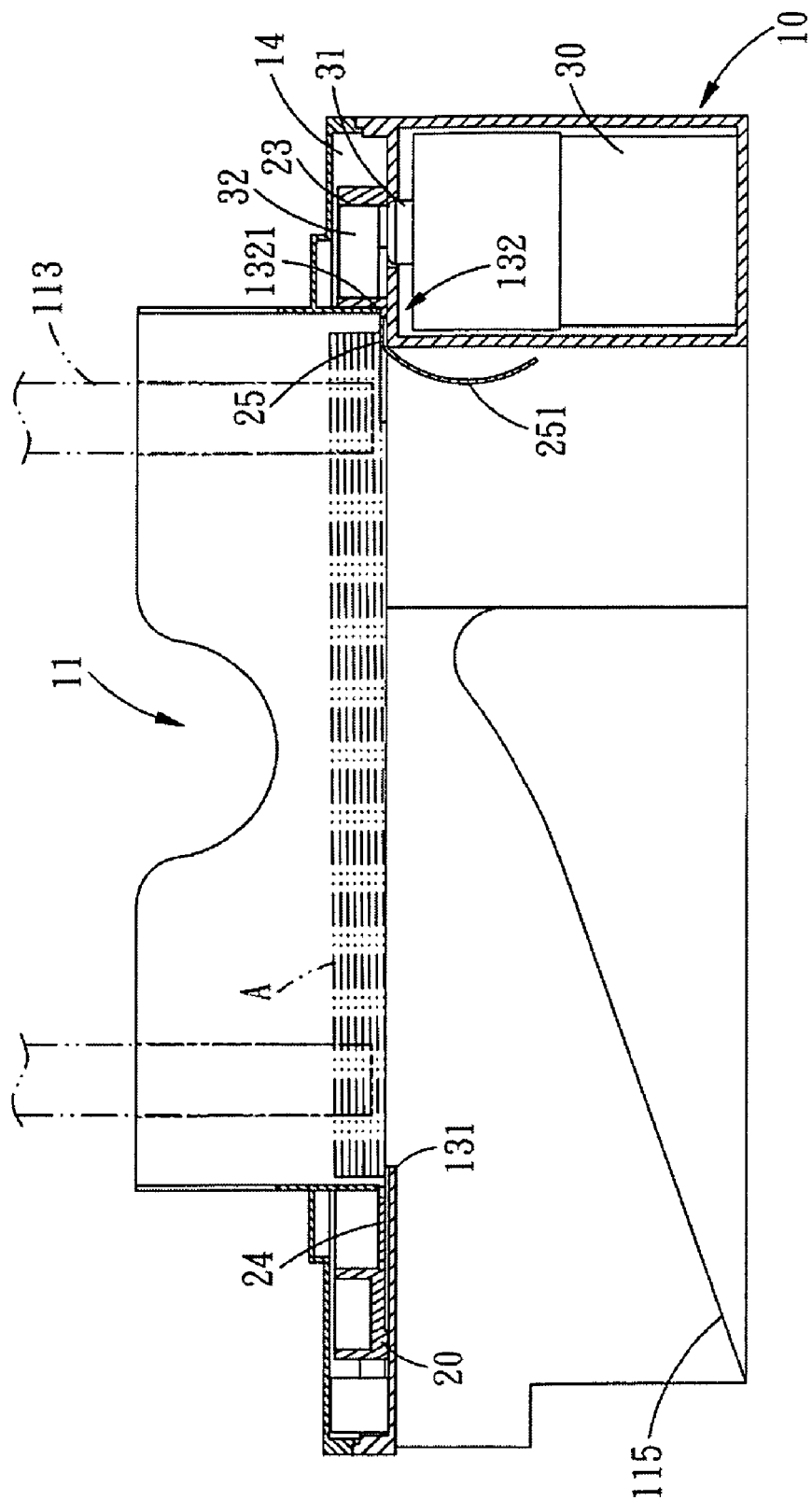
FIG. 4 is an illustrative view showing a feeding process of the disc feeding apparatus in accordance with the present invention.

The supporting base 10 includes a cover 12 and a base 13 that are assembled together by screws, and is defined with a feeding hole 11 in the direction of gravity. At a bottom of one side of the feeding hole 11 is outwardly formed a feeding opening 114. Around the edge of the feeding hole 11 is formed an annular flange 111, and on opposite sides of the annular flange 111 are disposed a plurality of sockets 112 for installing guiding posts 113, so as to receive discs A in a space defined by the guiding posts 113. Between the cover 12 and the base 13 is formed an annular operation space 14. On two opposite sides of the base 13 are defined with a first protruding portion 131 and a second protruding portion 132 located corresponding to the feeding hole 11. In a center of the first protruding portions 131 is formed a guiding groove 1311 in communication with the operation space 14. In a center of the second protruding portion 132 is pivotally disposed a piece 251 having a smooth surface, and the position at which the piece 251 is pivoted corresponds to the feeding opening 114 of the feeding hole 11. An upper portion of the second protruding portion 132 is defined with an avoiding groove 1321 (as shown in FIG. 4) which allows for accommodation of an edge of the disc A. The avoiding groove 1321 is in communication with the operation space 14. On an inner surface of the feeding hole 11 is formed a protruding slant feeding surface 115 that is connected between a position where the disc A is to fall off and the feeding opening 114, and the falling disc A can be guided out of the feeding opening 114 by the cooperation of gravity and the protruding slant feeding surface 115. In addition, a plurality of guiding grooves 141 is defined in the operation space 14, and in the operation space 14 of the supporting base 10 is defined a through hole 142 located corresponding to the feeding opening 114.

The pusher 20 is an integrally formed annular plastic member. In a center of the pusher 20 is defined a hole 21 located corresponding to the feeding hole 11 of the supporting base 10. The pusher 20 is disposed in the operation space 14 of the supporting base 10 and is provided with a plurality of protruding guide posts 22 to be movably inserted in the guiding grooves 141 of the supporting base 10. In the pusher 20 is defined an elliptical groove 23 located corresponding to the through hole 142 of the operation space 14, and in the elliptical groove 23 is defined with an admissible space 231 located in the non-operating direction. The pusher 20 is protrusively formed with a first pushing portion 24 located corresponding to the guiding groove 1311 of the first protruding portion 131. The first pushing portion 24 is slidably disposed in the guiding groove 1311, and the thickness of the first pushing portion 24 is not larger than that of the disc A. The pusher 20 is protrusively formed with a second pushing portion 25 located corresponding to the avoiding groove 1321 defined in the upper portion of the second protruding portion 132. The first and second pushing portions 24 and 25 cooperate with the first and second protruding portions 131 and 132 to restrict and support the disc A.

The electric driving device 30 can be an electric motor and is fixed in the supporting base 10. The electric driving device 30 drives a power shaft 31 to rotate, and the power shaft 31 is passed through the through hole 142 of the operation space 14 of the supporting base 10. On a top of the power shaft 31 is installed an eccentric member 32 that is an eccentrically installed elliptical block received in the elliptical groove 23 of the pusher 20. When the electric driving device 30 drives the power shaft 31 to rotate, the eccentric member 32 rotates in the elliptical groove 23. Since in the elliptical groove 23 is defined with an admissible space 231 located in the non-operating direction, the eccentric member 32 will drive the pusher 20 to back and forth repeatedly in a predetermined direction.

Figure 5:
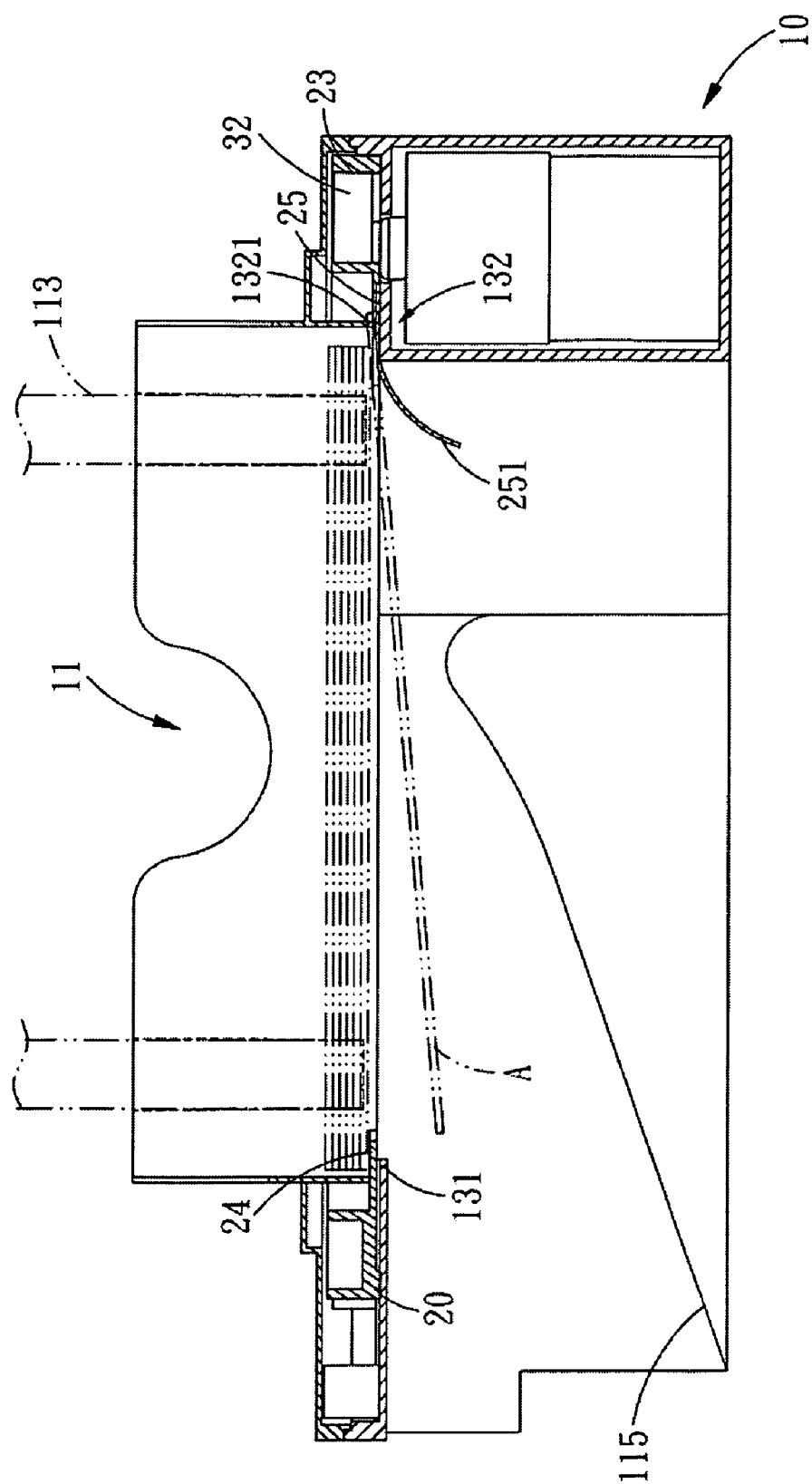
FIG. 5 is an illustrative view showing the feeding process of the disc feeding apparatus in accordance with the present invention.
Figure 6:
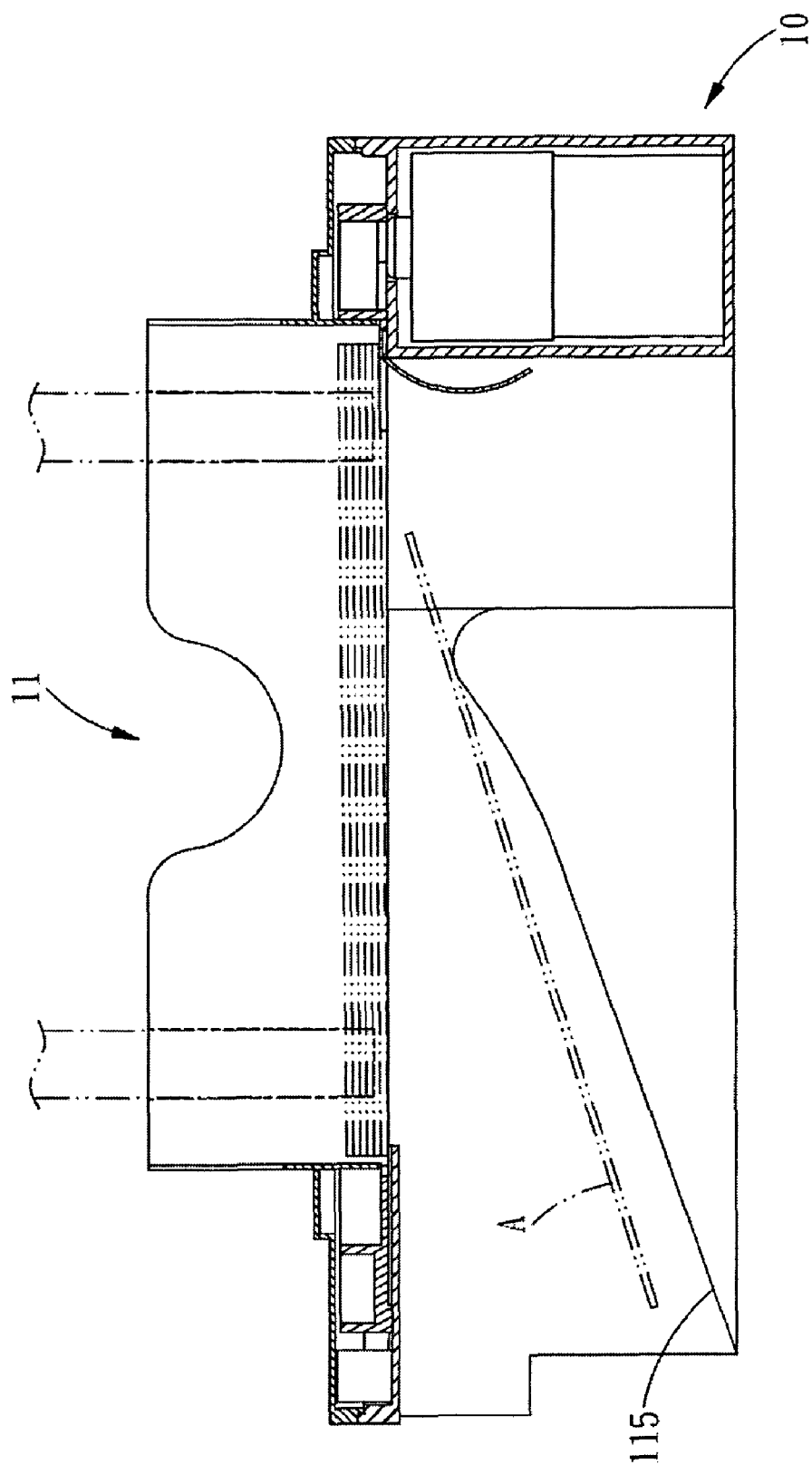
FIG. 6 is an illustrative view showing the feeding process of the disc feeding apparatus in accordance with the present invention.

Referring to FIGS. 4-6, the operation of the present invention is described as follows:

FIG. 4 shows that the disk A is in a standby state of being ready to be fed.

A plurality of stacked discs A of the present invention is received in a space defined by the guiding posts 113 and are guided by the annular flange 111 into the feeding hole 11 (the common disc container can also be mounted outside the annular flange 111). At this moment, the first pushing portion 24 of the pusher 20 will slide backward to the rear portion of the guiding groove 1311 of the first protruding portion 131 of the supporting base 10, and the second pushing portion 25 of the pusher 20 will extend to a position above the second protruding portion 132 (to be inserted into the avoiding groove 1321). Since the first and second pushing portions 24 and 25 cooperate with the first and second protruding portions 131 and 132 to restrict and support the disc A, and the first protruding portion 131 of the supporting base 10 is protruded out of the inner surface of the feeding hole 11, the bottom one of the discs A will be supported by the second pushing portion 25 and the first protruding portion 131 and engaged in the top portion of the feeding hole 11. Therefore, the problem of unexpected falling off of the disk A can be prevented, and the disk A is ready to be fed.

FIG. 5 shows the state of feeding the disk A.

The electric driving device 30 drives the power shaft 31 to rotate, the eccentric member 32 rotates 180 degrees in the elliptical groove 23 and drives the pusher 20 to back and forth. Since in the elliptical groove 23 is defined with an admissible space 231 located in the non-operating direction, the eccentric member 32 will drive the pusher 20 to move towards the direction opposite the feeding opening 114. At this moment, the first pushing portion 24 of the pusher 20 will move to the front portion of the guiding groove 1311 of the first protruding portion 131 of the supporting base 10, and the second pushing portion 25 of the pusher 20 will move back into the avoiding groove 1321. Since the advancement of the first pushing portion 24 will push the disk A towards the second protruding portion 25, and one edge of the disc A will move back into the avoiding groove 1321 along with the second pushing portion 25, the other edge of the disc A will be inclined downward and will finally fall off by gravity.

At the same time, the same edge of the next disc A to be fed is not pushed by the first pushing portion 24 and therefore will be stacked on the first pushing portion 24. The other edge of the next disc A to be fed will also be unable to move into the avoiding groove 1321 and will be accordingly stacked on the second protruding portion 132.

FIG. 6 shows the state of finishing the feeding of the disk A.

The electric driving device 30 drives the power shaft 31 to rotate continuously, the eccentric member 32 rotates 180 degrees in the elliptical groove 23 again and drives the pusher 20 to move back to its original position. Since in the elliptical groove 23 is defined an admissible space 231 located in the non-operating direction, the eccentric member 32 will drive the pusher 20 to move towards the direction of the feeding opening 114.

At this moment, the first pushing portion 24 of the pusher 20 will slide backward to the rear portion of the guiding groove 1311 of the first protruding portion 131 of the supporting base 10, and the second pushing portion 25 of the pusher 20 will receive in the avoiding groove 1321. Since the advancement of the 24 has caused the inclination and falling-off of one edge of the disc A, the return motion of the 25 will cause the other edge of the disc A to fall off towards the direction of the feeding opening 114. The falling disc A will fall onto the protruding slant feeding surface 115, since the protruding slant feeding surface 115 is connected between the position where the disc A is to fall off and the feeding opening 114, the falling disc A can be slid out of the feeding opening 114 by the inclined gravity.

At the same time, the next disc A moves the position of the previously fed disc, and the bottom one of the discs A will be supported by the second pushing portion 25 and the first protruding portion 131 and engaged in the top portion of the feeding hole 11. Therefore, the problem of unexpected falling off of the disk A can be prevented, and the disk A is ready to be fed.

The key point of the present invention is that the pusher 20 of the disc feeding apparatus is driven by the electric driving device 30 to back and forth. The present invention can use the precise control electric driving device 30 to cooperate with other electric control disc apparatuses (such as disc rewriter). With the simplified structure design, the present invention can perform the disk feeding operation efficiently and precisely for a long tome.

It is to be noted that the second protruding portion 132 is pivotally disposed with the piece 1251 having the smooth surface, and the position at which the piece 1251 is pivoted corresponds to the feeding opening 114 of the feeding hole 11. When one edge of the disc A is pushed by the second pushing portion 25 towards the direction of the feeding opening 114, the piece 1251 having the smooth surface enables the disc A to fall off quickly, such that the disc A can be fed successfully, so as to prevent the disc A from being scraped due to the friction of the disc A and the second protruding portion 132.

In addition, the pusher 20 of the present invention is the integrally formed annular plastic member, and the ordinary combined types by engaging and linking are still within the scope of the present invention.

When the discs A are going to be used up, additional discs A to be added can be stacked on the original discs A left in the storage base 20 because the discs A are fed in such an order that the bottom one of the discs A will be fed before of the other discs A. Therefore, first in first out can be achieved.

Further, in the operation space 14 of the supporting base 10 is installed a sensor B for sensing the operation of the pusher 20, so as to electrically control the electric driving device 30.

The protruding slant feeding surface 115 of the supporting base 10 enables the discs A to leave the supporting base 10 separately. The protruding slant feeding surface 115 can also be transversely disposed in the feeding hole 11, and the feeding opening 114 can be located corresponding to automatic transmission mechanisms, such as transmission belt or tray, so that the next step or process, such as packaging or placing the discs in the disc container can be performed successfully.

To summarize, the disc feeding apparatus of the present invention comprises the supporting base, the pusher and the electric driving device. The electric driving device drives the pusher to back and forth, such that one edge of the disc is protruded out of the first protruding portion, and the other edge of the disc is limited by the avoiding groove of the second protruding portion and is pushed to be fallen off by the pusher, such that the disc will fall out of the disc feeding apparatus, thus finishing the feeding of the disc.

The present invention can use the precise control the electric driving device to cooperate with other structures. With the simplified structure design, the present invention can perform the disk feeding operation efficiently and precisely for a long tome.

While we have shown and described various embodiments in accordance with the present invention, it should be clear to those skilled in the art that further embodiments may be made without departing from the scope of the present invention.

What is claimed is:

1. A disc feeding apparatus, comprising:
   a supporting base (10) defined with a feeding hole (11) in a direction of gravity, two opposite sides of the feeding hole (11) being defined a first protruding portion (131) and a second protruding portion (132), respectively, and at a bottom of one side of the feeding hole (11) being outwardly formed a feeding opening (114), moreover, the supporting base (10) being formed with an operation space (14) defining with at least one through hole (142), wherein in a center of the first protruding portion (131) is formed a guiding groove (1311) in communication with the operation space (14) of the supporting base (10), an upper portion of the second protruding portion (132) being defined with an avoiding groove (1321) which allows for accommodation of an edge of a disc, the avoiding groove (1321) being in communication with the operation space (14) of the supporting base (10); and a pusher (20) disposed in the operation space (14) of the supporting base (10) and protrusively formed with a first pushing portion (24) located corresponding to the guiding groove (1321) of the first protruding portion (131) of the supporting base (10), the first pushing portion (24) being slidably disposed in the guiding groove (1321) of the first protruding portion (131) and a thickness of the first pushing portion (24) is not larger than that of the disc, moreover, the pusher (20) being protrusively formed with a second pushing portion (25) located corresponding to the avoiding groove (1321) defined in the upper portion of the second protruding portion (132), the second pushing portion (25) being slidably disposed on the second protruding portion (132), the pusher (20) cooperating with the supporting base (10) to support and release the disc to be fed, in the pusher is defined an elliptical groove (23) located corresponding to the through hole (142) of the operation space (14) of the supporting base (10), and in the elliptical groove (23) is defined with an admissible space (231) located in a non-operating direction; and at least one electric driving device (30) comprising an electric motor, a power shaft (31) and an eccentric member (32), the electric driving device (30) being fixed in the supporting base (10) and driving the power shaft (31) to rotate, the power shaft (31) being passed through the through hole (142) of the operation space (14) of the supporting base (10), on a top of the power shaft (31) being installed the eccentric member (32) that is received in the elliptical groove (23) of the pusher (20), the eccentric member (32) rotating in the elliptical groove (23) of the pusher (20) and driving the pusher (20) to back and forth repeatedly in a predetermined direction;

wherein a protruding slant feeding surface (115) is formed on an inner surface of the feeding hole (11) and is connected between a position where the disc is to fall off and the feeding opening (114), and the disc being guided out of the feeding opening (114) by cooperation of gravity and the protruding slant feeding surface (115).

2. The disc feeding apparatus as claimed in claim 1, wherein the eccentric member is an eccentrically installed elliptical block.

3. The disc feeding apparatus as claimed in claim 1, wherein the supporting base includes a cover and a base that are assembled together, an integrally formed annular plastic member.

4. The disc feeding apparatus as claimed in claim 1, wherein a plurality of sockets are disposed on opposite sides of the feeding hole of the supporting base and are provided for installing guiding posts, so as to receive a large number of discs in a space defined by the guiding posts.

5. The disc feeding apparatus as claimed in claim 1, wherein an annular flange is formed around an edge of the feeding hole of the supporting base and is provided for guiding the disc to be fed.

6. The disc feeding apparatus as claimed in claim 1, wherein a the protruding slant feeding surface can also be transversely disposed in the feeding hole of the supporting base and is connected between the position where the disc is to fall off and the feeding opening, and the disc is slid out of the feeding opening by the cooperation of gravity and the protruding slant feeding surface.

7. The disc feeding apparatus as claimed in claim 1, wherein a plurality of guiding grooves is defined in the operation space of the supporting base, and the pusher is provided with a plurality of protruding guide posts to be movably inserted in the guiding grooves of the supporting base.

8. The disc feeding apparatus as claimed in claim 1, wherein a sensor is provided in the operation space of the supporting base and is provided for sensing an operation of the pusher, so as to electrically control the electric driving device.

9. The disc feeding apparatus as claimed in claim 1, wherein the operation space of the supporting base is annular shaped, and the pusher disposed in the operation space of the supporting base is assembly assembled by engaging manner and liking manner.

* * * * *